April 25, 1961

A. G. CARLTON 2,981,500

SERVO CONTROL SYSTEM FOR GUIDED MISSILE

Filed March 30, 1953

A. GEORGE CARLTON
INVENTOR

BY
ATTORNEYS

United States Patent Office

2,981,500
Patented Apr. 25, 1961

2,981,500

SERVO CONTROL SYSTEM FOR GUIDED MISSILE

Alvar George Carlton, Silver Spring, Md., assignor to the United States of America as represented by the Secretary of the Navy Filed Mar. 30, 1953, Ser. No. 345,295

9 Claims. (Cl. 244—14)

This invention relates to an improved servo control system. More specifically, it relates to apparatus for maintaining the gain in a guided missile roll control servo system at the greatest possible value consistent with tolerable roll oscillation amplitudes.

Some guided missiles in flight are roll stabilized about a desired axis by a closed loop servo system that regulates wing surfaces to provide the required roll torques. One form of guided missile control system provides both roll and steering control by the same set of wing surfaces and large steering maneuvers introduce large roll torques which cause rolling motions of serious magnitude. In general, maneuvers, and changes in the speed of the missile and in the atmospheric pressure, cause variations in the aerodynamic effectiveness of the wings which are utilized to produce restoring roll torques, thereby increasing the difficulty of maintaining satisfactory roll stabilization.

It is an object of this invention to provide an improved servo control system in which the amplifier gain is always maintained at the maximum consistent with the acceptable stability of the system.

It is an additional object of this invention to provide an apparatus which will minimize the deleterious effects of uncontrolled variations in wing effectiveness on roll control.

Another object of this invention is to provide an apparatus which will automatically adjust the gain of the servo amplifier of a missile roll control system to a maximum consistent with tolerable roll oscillation amplitudes.

A more specific object is to provide an automatic gain control for use in a missile roll control system that will maintain the gain in a wing servo system at a maximum even where wing effectiveness is at a minimum.

Figure 1:
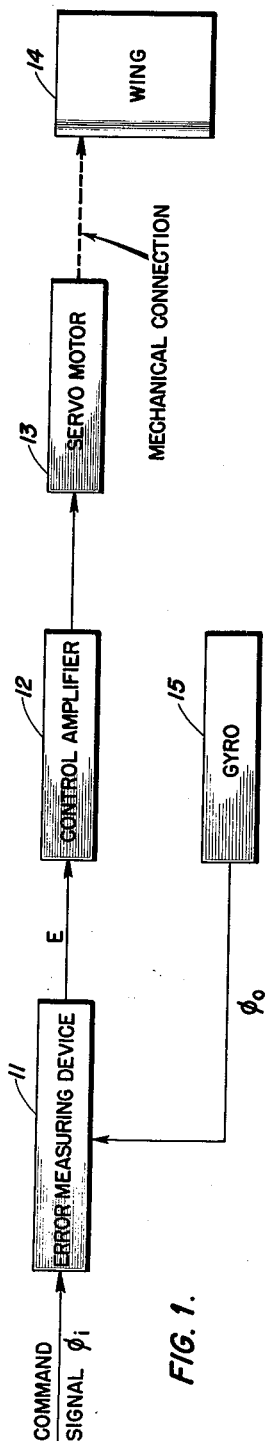
Figure 2:
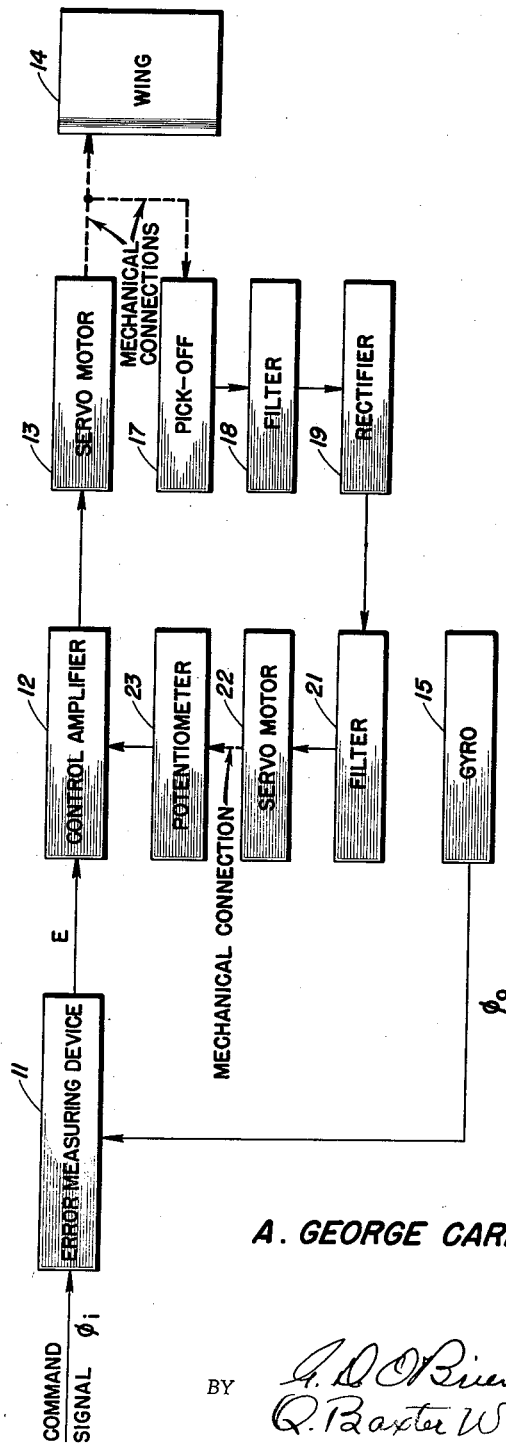

Further objects of the present invention along with its attendant advantages will become evident from the following detailed description taken in conjunction with the accompanying drawings in which:

Fig. 1 is a block diagram illustrating a prior art missile roll control system; and Fig. 2 is a block diagram illustrating a missile roll control system incorporating the present invention.

Referring to Fig. 1, there is illustrated a typical prior art roll control system for a guided missile. The roll control system comprises a closed loop servo system including an error measuring device 11 having its output connected to a control amplifier 12 which operates a servo motor 13, such as a hydraulic actuator, to regulate the differential angle of the missile wing 14. A gyroscope 15 senses the change in roll condition of the missile caused by the changes in wing angle or other external influences and produces a signal which is supplied to the error measuring device 11 the output of which is fed back into the system in typical closed loop servo fashion. The error measuring device 11 may be a selsyn control transformer, a resistance summing network or any suitable device which can function with the gyroscope 15 to indicate the difference between the input and the output of the loop. Similarly, the control amplifier may be any device that can utilize the signal from the error measuring device and provide power to drive the servo motor as required.

Considering the operation of this typical system in detail, an input or command signal $\phi_i$ in the form of radar guidance intelligence transmitted from the command station and indicative of the predetermined, desired degree of roll is fed into the error measuring device 11 where it is compared with a signal $\phi_o$ representing present missile roll condition to provide an error signal E. Usually it is desired to stabilize the missile in the zero roll position. The output E of the error measuring device 11 is fed into the control amplifier 12 where it is amplified and converted into a signal which will operate the servo motor in the proper direction and for a sufficient length of time to cause the wing to assume a new position corresponding to the command signal. To effect this the signal is fed from the control amplifier to the servo motor 13 which is then actuated to vary the angle of the wing 14. A variation in wing angle produces an aerodynamic effect upon the missile to change its attitude. This change in missile attitude is sensed by the gyroscope 15 and an instantaneous signal $\phi_o$ is generated which is compared with the instantaneous command signal $\phi_i$ in the error measuring device 11. Any error signal E resulting from this comparison is utilized to further actuate the wing 14 as described above to impose a roll torque on the missile to bring the missile to its desired roll attitude, as is typical of closed loop control systems.

As mentioned previously the aerodynamic effectiveness of the wing 14 in stabilizing a rolling missile is varied by the missile steering maneuvers and other factors. In general, if the gain of the control amplifier 12 exceeds a certain critical value determined by the wing effectiveness at the time, instability characterized by wing oscillations will occur. In more detail, if the gain setting of the control amplifier 12 is based upon a minimum value of wing effectiveness, roll control will become unstable and the wings and missile will oscillate, during periods of high wing effectiveness. On the other hand, if the gain is based upon a maximum value of effectiveness, satisfactory roll control will not be possible during periods of low wing effectiveness. Therefore, since the wing effectiveness is constantly varying, the control amplifier gain must be varied accordingly if satisfactory roll control is to be obtained.

The present invention overcomes these difficulties by maintaining the gain of the control amplifier 12 at the greatest possible value consistent with tolerable wing oscillation amplitudes. This feature makes it possible to achieve the best roll stabilization that can be obtained under the extremely wide variations in aerodynamic conditions to be encountered by the missile.

Referring now to Fig. 2, the automatic gain control apparatus of the present invention is shown as applied to the typical roll control system of Fig. 1. A pick-off device 17 is mounted on the output shaft of the servo motor 13 or associated with the wing actuating mechanism in any suitable manner to sense the presence or absence of oscillations of the wing and pass indications of said oscillations, if any, to a filter 18 designed to pass components at the resonant frequency of the system and attenuate other frequencies. The pick-off 17 may be any suitable electrical device that is sensitive enough to provide voltages representing small wing positions. The resonant frequency components in the pick-off output are detected by a rectifier 19 and fed through a second filter 21 that functions as a smoothing network to stabilize the automatic gain control feedback system. The output of the second filter 21 then energizes a servo motor 22 which drives a potentiometer or other gain control device 23 to vary the gain of the control amplifier. It will be understood that the rectifier 19 includes a source of bias voltage which is added to the output of said rectifier and supplied to the servo motor 22 so that the latter will always return to its original rotary position.

In operation, any loop gain larger than some critical value will cause oscillations in the servo loop which upon being transmitted around the loop will regenerate and increase in amplitude until the missile goes completely out of control in roll or until some part of the system saturates and provides a large amplitude limit cycle oscillation which also is undesirable. In the absence of the automatic gain control device being described, this unstable operation could exist if the loop gain were adjusted for a given value of wing effectiveness and subsequent maneuvers or flight conditions should increase the actual wing effectiveness so that the loop gain exceeded the critical value mentioned above. However, the automatic gain control system operates to eliminate this effect. The pick-off 17 senses the oscillations in the servo loop and sends indications thereof to the filter 18. The voltages representing them are passed by the filter 18 to the rectifier 19 and the smoothing filter 21 where they are converted to direct current components of varying amplitude. When their amplitude is great enough the direct current components energize the servo motor 22 to drive the potentiometer 23 to reduce the gain of the control amplifier. By thus reducing the control amplifier gain, the response of the servo motor is reduced in magnitude and oscillations of undesirable amplitude are eliminated. When the oscillation amplitudes have been reduced to or below the tolerable value no indications are passed by the filter 18 to drive the servo motor 22. The latter will revert to its original position because of the bias voltage included in the rectifier output. This increases the gain of control amplifier 12 to the level which is maintained in the absence of oscillations of intolerable magnitude in the servo loop. By thus increasing the control amplifier gain, the response of the servo mechanism is increased and adequate roll control may be attained.

It is pointed out that the application of this system is not restricted to missile roll control systems. Such an arrangement would be useful in controlling any of the missile wing surfaces or in other closed loop control system. Furthermore, a method other than varying the position of the sliding contact of a potentiometer can be employed to vary the gain of the amplifier.

Obviously, many other embodiments other than the one shown and described are possible without digressing from the teachings of the invention as defined in the appended claims.

What is claimed is:

1. A servo control system for a guided missile having an aerodynamic surface, comprising, means for providing a first signal representing the roll condition of the missile, means for comparing said first signal with a second signal representing a predetermined roll condition of the missile thereby providing an error signal, an amplifier having a variable gain characteristic for amplifying the error signal, means for varying the gain of said amplifier in accordance with the effectiveness and amplitude of motion of said aerodynamic surface in controlling the roll condition of said missile, whereby the gain of said amplifier will be maintained at the maximum consistent with the acceptable stability of the roll control system, and means for receiving the variably amplified error signal and for actuating said aerodynamic surface to roll stabilize said missile.

2. A servo control system for a guided missile having an aerodynamic surface for controlling the attitude of the missile, comprising, means for actuating said surface, means for providing a first signal representing the attitude of the missile, means for comparing said first signal with a second signal representing a predetermined attitude of the missile thereby providing an error signal, means for converting said error signal into a signal that can be utilized by the means for actuating the aerodynamic surface, a variable gain amplifier for amplifying said converted error signal, means for varying the gain of said amplifier in accordance with the effectiveness and amplitude of motion of said aerodynamic surface in controlling the attitude of said missile, whereby the gain of said amplifier will be maintained at the maximum consistent with the acceptable stability of the system, and means for supplying said amplified converted error signal to said surface actuating means.

3. A servo control system as recited in claim 2, wherein the means for varying the gain of the amplifier includes means for sensing resonant oscillations of the system, and means connected to said amplifier and actuated by said sensing means to reduce the gain of said amplifier when the level of the resonant oscillations exceeds a predetermined level.

4. A servo control system as recited in claim 2, wherein the means for varying the gain of the amplifier includes a pick-off connected to the means for actuating the aerodynamic surface, said pick-off being arranged to sense oscillations of said surface, a servo motor electrically connected to said pick-off, and means actuated by said servo motor for reducing the amplifier gain when said oscillations exceed a predetermined level.

5. A servo control system for a guided missile having an aerodynamic surface for controlling the roll condition of the missile, comprising, a hydraulic actuator for regulating the angle of said surface, a gyroscope for providing a signal representing the roll condition of the missile, means for comparing said signal with a command signal representing a predetermined roll condition of the missile thereby providing an error signal, means for converting said error signal into a signal that can be utilized by said actuator, a variable gain amplifier for amplifying said converted error signal, means for automatically varying the gain of said amplifier in accordance with the effectiveness and amplitude of motion of said aerodynamic surface in controlling the roll of said missile, whereby the gain of said amplifier will be maintained at the maximum consistent with the acceptable stability of the system, and means for supplying the output of said variable gain amplifier to said surface regulating means.

6. In combination with a guided missile having an aerodynamic surface for controlling the roll condition of the missile, a servo control system comprising, means for actuating said surface, means for providing a signal representing the roll condition of the missile, means for comparing said signal with a command signal representing a predetermined roll condition of the missile thereby providing an error signal, a variable gain amplifier for amplifying the error signal, means for varying the gain of said amplifier in accordance with the effectiveness and amplitude of motion of said aerodynamic surface in controlling the roll condition of said missile whereby the gain of said amplifier will be maintained at the maximum consistent with the acceptable stability of the roll control system, and means for supplying the output from said amplifier to said surface actuating means.

7. In combination with a guided missile having an aerodynamic surface for controlling the roll condition of the missile, a servo system, comprising, means for actuating said surface, means for providing a signal representing the roll condition of the missile, means for comparing said signal with a command signal representing the predetermined roll condition of the missile thereby providing an error signal, means for converting said error signal into a signal that can be utilized by the means for actuating the aerodynamic surface, a variable gain amplifier for amplifying said error signal, means for varying the gain of said amplifier in accordance with the effectiveness and amplitude of motion of said aerodynamic surface in controlling the roll condition of said missile whereby the gain of said amplifier will be maintained at the maximum consistent with the acceptable stability of the system, and means for supplying the output from said variable gain amplifier to said surface actuating means.

8. A control system for a guided missile having an aerodynamic surface for controlling the attitude of the missile in flight comprising, means for actuating said surface, means providing a first signal representing the attitude of the missile, means for comparing said first signal with a second signal representing a predetermined attitude of the missile thereby providing an error signal, means for converting said error signal into a signal that can be utilized by said actuating means, said error signal converting means including a variable gain amplifier, means including a potentiometer for varying the gain of said amplifier in accordance with the effectiveness and amplitude of motion of said aerodynamic surface in controlling the attitude of said missile, whereby the gain of said amplifier will be maintained at the maximum consistent with the accepted stability of the system, and means for supplying the output from said amplifier to said surface actuating means.

9. A control system for a guided missile having an aerodynamic surface for controlling its attitude in flight, comprising, means detecting the attitude of the missile and providing a signal representing said attitude, means providing an error signal representing the difference between said attitude signal and a predetermined desired attitude signal, a control amplifier receiving said error signal and providing a magnified output proportional thereto, an adjustable potentiometer for controlling the magnitude of the output of said control amplifier, a servo motor for actuating said aerodynamic surface in accordance with the output of said control amplifier, means responsive to motion of said aerodynamic surface to provide a signal representing said motion, a filter to receive the signal of said last-named means and to separate resonant frequencies from said signal, and means responsive to the amplitude of said filtered resonant frequency signals for adjusting said potentiometer.

References Cited in the file of this patent

UNITED STATES PATENTS

| | | |
|---|---|---|
| 2,446,563 | Upton | Aug. 10, 1948 |
| 2,528,512 | Greenough | Nov. 7, 1950 |
| 2,544,922 | Greenough | Mar. 13, 1951 |
| 2,605,451 | Ward | July 29, 1952 |
| 2,615,658 | Young | Oct. 28, 1952 |
| 2,647,258 | McCoy | July 28, 1953 |
| 2,654,999 | Berge | Oct. 13, 1953 |